June 7, 1960 R. W. ANNESS 2,939,258
CARTON FORMING AND LOADING APPARATUS
Filed June 16, 1958 7 Sheets-Sheet 3

INVENTOR:
Russell W. Anness,
BY Bair Freeman & Molinare
ATTORNEYS.

June 7, 1960 R. W. ANNESS 2,939,258
CARTON FORMING AND LOADING APPARATUS
Filed June 16, 1958 7 Sheets-Sheet 6

INVENTOR:
Russell W. Anness,
BY Bair Freeman & McKinnie
ATTORNEYS.

United States Patent Office 2,939,258
Patented June 7, 1960

2,939,258

CARTON FORMING AND LOADING APPARATUS

Russell W. Anness, Middletown, Ohio, assignor to Lengsfield Brothers Inc., New Orleans, La., a corporation of Louisiana Filed June 16, 1958, Serial No. 742,369

16 Claims. (Cl. 53—183)

This invention relates to carton forming and loading apparatus and more particularly to apparatus for folding a carton blank, loading the blank with articles and securing the ends of the blanks together to complete a filled carton.

The invention is particularly applicable to the forming and filling of cartons of the type more particularly described and claimed in the co-pending application of Francis W. Fielding, Serial No. 695,643, filed November 12, 1957. Such cartons are of the open-ended type with foldably interconnecting side and end walls and with triangular saddles or gussets extending across the corners of the carton and held in extended position by webs and flaps at the side of the carton to retain articles therein.

It is one of the objects of the invention to provide a carton forming and loading apparatus which automatically folds and fills cartons, starting with a flat blank and ending with a completely filled carton.

Another object is to provide carton forming and loading apparatus in which the blank is partially folded to a condition in which end wall portions and saddles thereon are erected relative to one side wall, articles are placed in the carton on the side wall between the end walls and saddles and the remaining walls of the carton are folded over the articles and glued to complete a filled carton.

According to various features of the invention, the side portions of the flat blank constituting flaps, saddles and connecting webs are first folded about straight score lines upon the blank, one side wall of the blank is then depressed relative to the remaining portion of the blank to fold the adjacent end wall portions upward and to outfold the saddles and webs, articles are then fed against the side wall and between the ends and saddles and the remaining side wall is folded over the articles and secured to one end wall to complete the carton. Preferably, the ends of the blank lie at one end wall of the carton and the outer surface of one end is glued and then tucked in between the other end of the blank and the articles and the overlapping ends of the blank are subjected to pressure between horizontally spaced vertical belts to complete the glued joint. The entrance ends of the belts between which the cartons are pressed are preferably supported by eccentric drums which separate the belts to receive the folded and filled blanks and then move the belts together to grip the blanks.

The above and other objects and features of the invention will be more readily apparent from the following description when read in connection with the accompanying drawings, in which.

Figures 1, 2, 3, 4, 5:
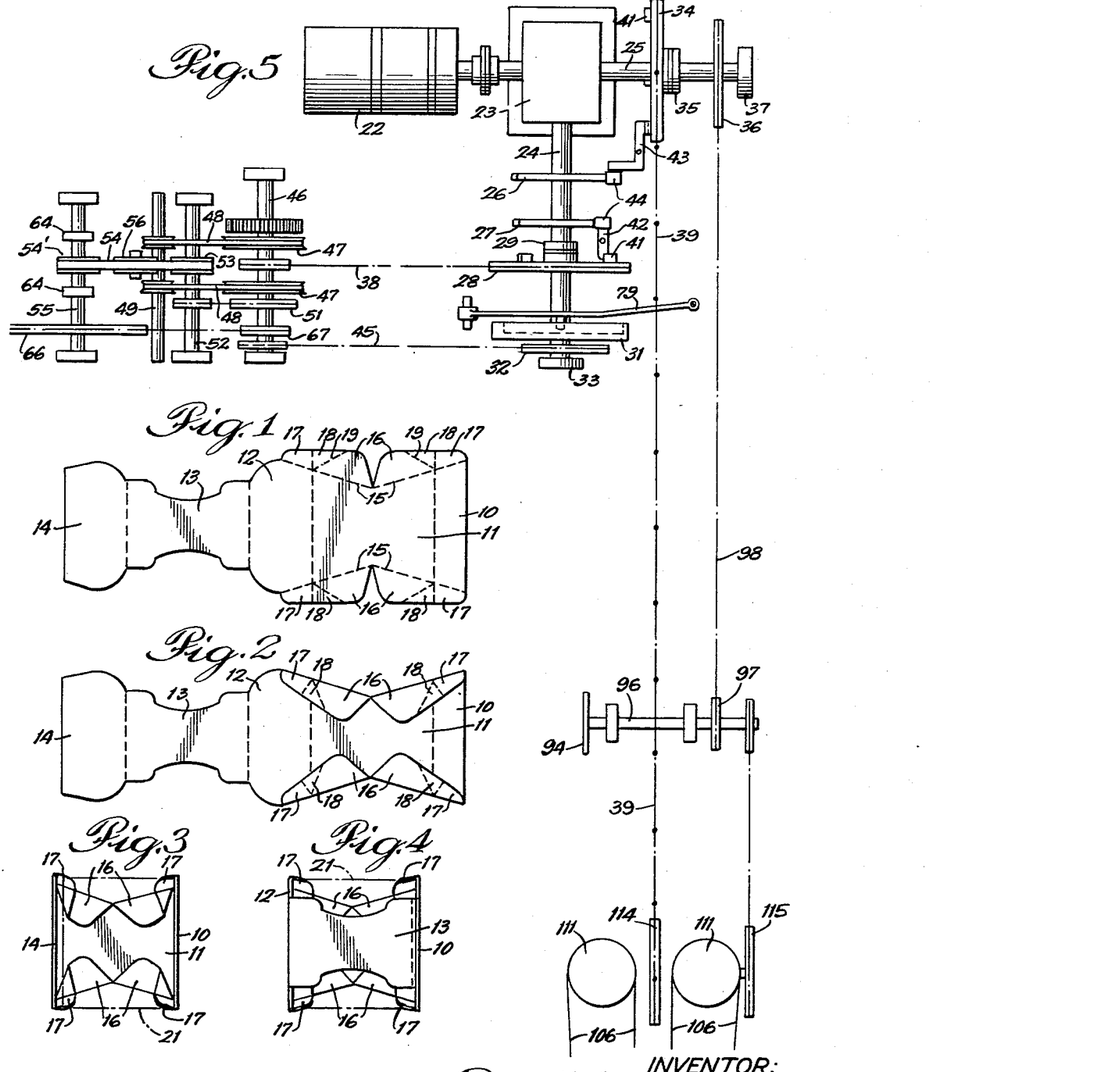
Figure 1 is a plan view of a blank to be folded and filled by the apparatus of the invention.
Figure 2 is a similar view at completion of the first folding operation.
Figure 3 is a similar view at the end of the second folding operation.
Figure 4 is an elevation of the completed blank.
Figure 5 is a diagrammatic view of the driving means for the various parts of the apparatus.

The apparatus of the invention is primarily intended to form and fill cartons from blanks, as shown in Figure 1, carrying the blanks through the several steps illusterated in Figures 2, 3 and 4. As shown, the blanks are of the open-ended type adapted to hold two cylindrical objects, such as flashlight batteries, or the like, in side-by-side relationship in the carton.

The apparatus is supplied with flat blanks, as shown in Figure 1, which are cut and scored to provide an end portion 10 foldably connected to a side wall portion 11 which is in turn foldably connected to an end wall portion 12. The second side wall portion 13 is foldably connected to the end wall portion 12 and to an end wall portion 14 at the end of the blank opposite to the end wall portion 10. The blank is scored between the adjacent wall portions so that they can be folded and the side edges of the side wall portion 11 are scored along straight lines 15 meeting at an obtuse angle centrally of the blank and extending across the fold lines between the side wall portion 11 and the adjacent end wall portions 10 and 12. The fold lines 15 define generally triangular flaps 16 at the sides of the side wall portion 11, generally triangular saddles or gussets 17 at the sides of the end wall portions and generally triangular webs 18 interconnecting the flaps and the saddles and defined by score lines, as shown at 19.

In forming and filling a carton from a blank of this type, the first step is to fold the flaps, saddles and webs inwardly about the fold lines 15 flat upon the blank, as shown in Figure 2. Thereafter, the side wall portion 11 is depressed relative to the remainder of the blank to fold the end wall portions 10 and 12 upward at substantially right angles thereto, as shown in Figure 3. During this folding operation, the webs 18 will fold about the score lines 19 to overlie a portion of the flaps 16 and the saddles will extend outwardly from the end wall portions in a position to retain articles in the carton. With the blank in this condition, as shown in Figure 3, the articles may be fed downwardly upon the side wall portion 11, as shown by the dot-dash lines 21 in Figures 3 and 4. As illustrated, there are two cylindrical articles, such as flashlight batteries, lying in side-by-side relationship with their ends against the end wall portions 10 and 12 and with their cylindrical sides near the ends engaging the saddles or gussets 17 which hold the articles against movement laterally of the side wall portion.

To complete the carton the side wall portion 13 is folded over the articles to bring the end wall portions 10 and 14 into overlapping relationship. One of the end wall portions is glued before the final folding operation and after final folding operation the overlapped end wall portions are pressed together to complete a glued joint therebetween. At this time, the carton is completely formed and loaded ready for use.

The apparatus in general comprises two conveyors to which the flat blanks are fed at one end and which carry the blanks through the several folding, loading and pressing operations. The blanks are preferably fed from a magazine at one end of one conveyor and as they are carried along the one conveyor the first folding operation, as shown in Figure 2, is performed. The partially folded blank is then transferred to the second conveyor which is at right angles to the first conveyor where the side wall portion 11 of the blank is depressed, the articles are placed thereon and the gluing and remaining folding and tucking operations are performed. The second conveyor delivers the articles to a belt section wherein the carton is pressed tightly around the articles and the overlapping glued ends of the carton are pressed together to complete the glued joint.

The conveyors and other major parts of the apparatus are driven by a unitary drive means, as best shown in Figure 5 and 13 to 15 from a single driving source, such as an electric motor 22, as shown in Figure 5. The motor 22 is connected through a right angle gear box 23 to two shafts 24 and 25 at right angles to each other. The shaft 24 drives the first conveyor and the shaft 25 drives the second conveyor and the pressing means.

Figure 13:
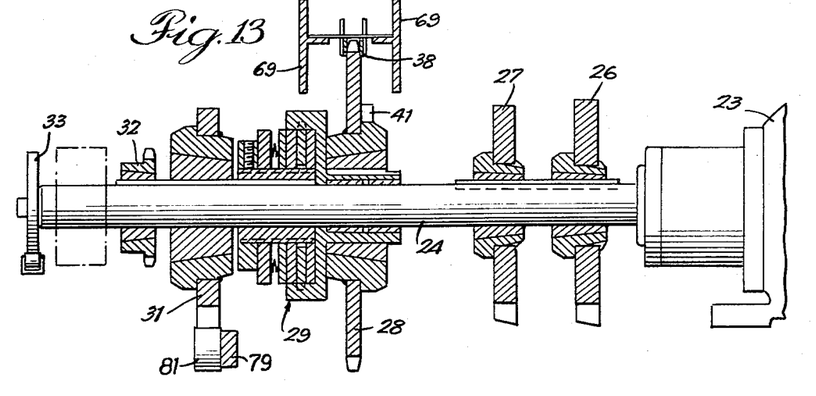
Figure 13 is a sectional view through the driving means for the first conveyor.

As shown in Figures 5 and 13, the shaft 24 carries in succession two cams 26 and 27, a conveyor driving sprocket 28, a slip clutch mechanism indicated generally at 29 which drives the sprocket 28, a cam 31 and a sprocket 32. The shaft 24 is preferably supported by an outboard bearing 33 spaced from the gear box 23.

Figure 14:
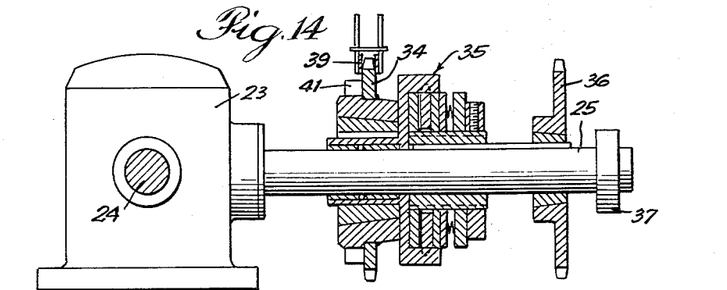
Figure 14 is a sectional view through the driving means for the second conveyor.
Figure 15:
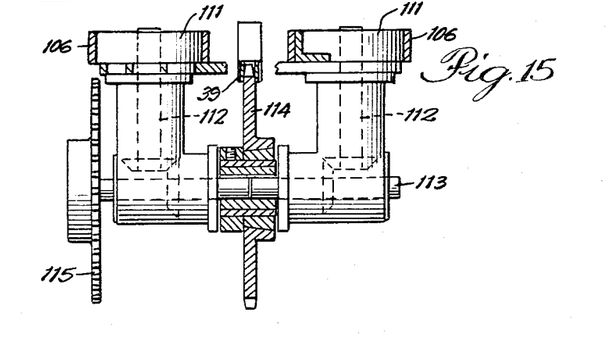
Figure 15 is a sectional view with parts in elevation through the driving means for the vertical pressing belts.

The shaft 25, as best seen in Figure 14, carries a sprocket 34 connected to the shaft through a slip clutch 35 and a second sprocket 36 near the outer end of the shaft. The shaft 25 may be supported by a suitable outboard bearing 37 adjacent the end thereof remote from the gear box 23.

The sprocket 28 drives a first main conveyor indicated diagrammatically at 38 in Figure 5 and the sprocket 34 similarly drives a second main conveyor indicated at 39. The two conveyors 38 and 39 are adapted to be driven intermittently and for this purpose the sprockets 28 and 34 are provided with locking projections 41 which are engaged respectively by locking dogs 42 and 43 to hold the sprockets against rotation. Each of the locking dogs carries a roller 44 and the rollers 44 are engageable respectively with the cams 26 and 27, as best seen in Figure 5. The cams may be provided with one or more rises so that upon each revolution or partial revolution thereof the locking dogs will be released and the sprockets will be driven through an angle determined by the spacing of the dogs. After turning through the predetermined angle, the locking projections 41 on the sprockets will again engage the locking dogs and the sprockets will be held against rotation, the clutches 29 and 35 slipping at this time. The clutches 29 and 35 are conventional slip clutches and since their construction forms no part of the present invention, they will not be described in detail.

The sprocket 32 on the shaft 24 drives through a sprocket chain 45, a cross shaft 46 adjacent the starting end of the first conveyor and which may also carry an idler sprocket over which the first conveyor runs. The shaft 46 carries a pair of V-belt pulleys 47 over which belts 48 are trained with the belts 48 extending over pulleys on an idler shaft 49. In addition, the shaft 46 carries a driving sprocket 51 which drives a shaft 52 lying between the shafts 46 and 49. The shaft 52 carries a pulley 53 over which a feed belt 54 is trained, the feeding belt extending over an idler pulley 54' on shaft 55 at the inlet end of the machine with idler pulleys 56 between the shaft 55 and pulley 53 if desired to support the belt 54.

Figures 6, 6B:
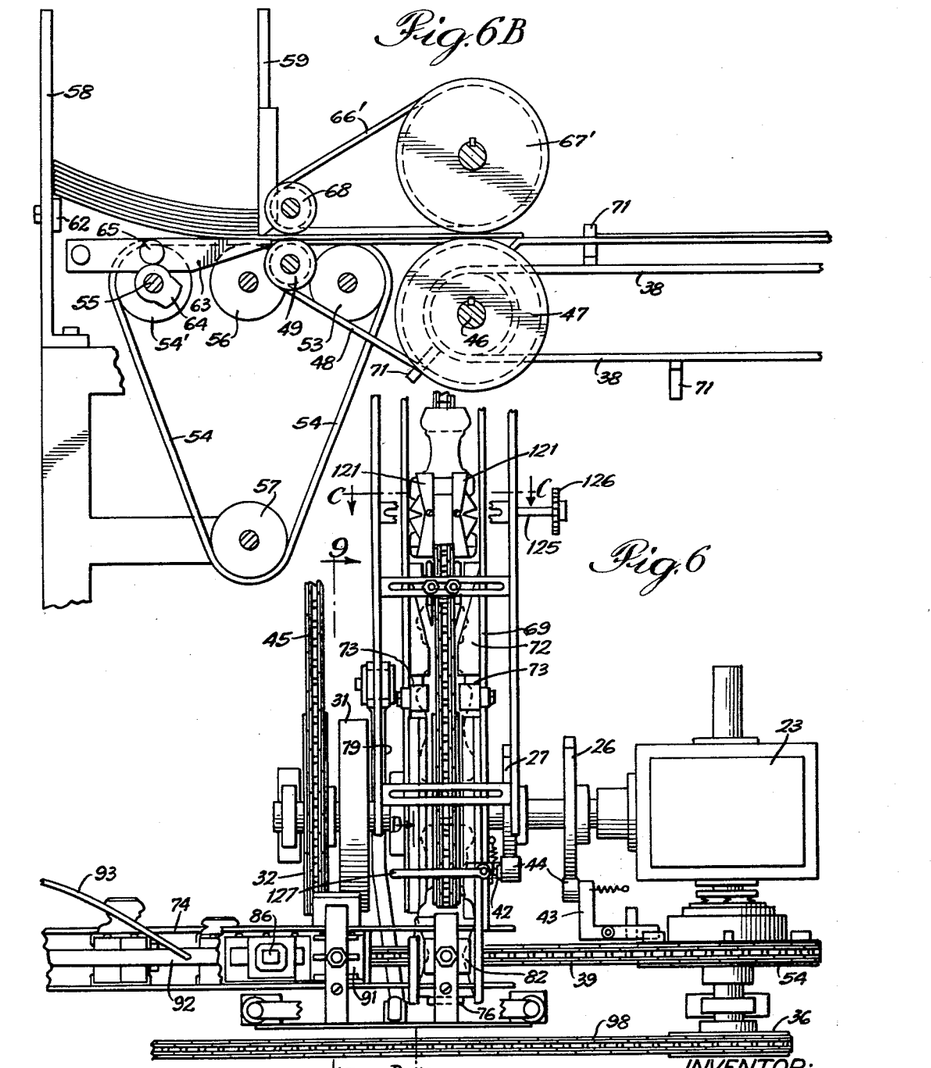
Figure 6 is a partial top plan view of the first conveyor and associated parts.
Figure 6B is a partial side elevation of the feeding means and first conveyor.
Figure 6A:
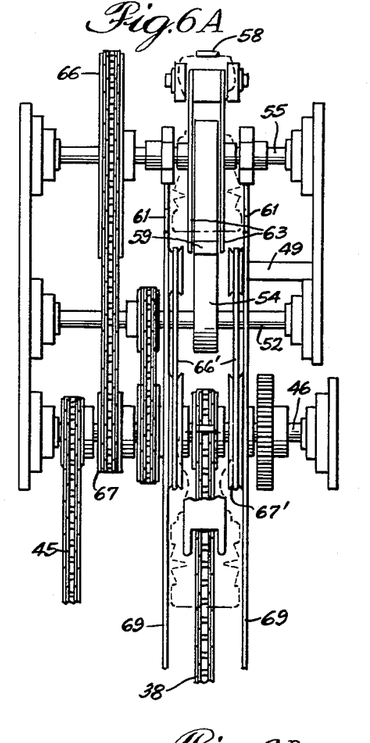
Figure 6A is a top plan view of the feeding means.

As best seen in Figure 6B, the belt 54 extends over an idler pulley 57 and has a horizontal run between the pulleys 53 and 54' for feeding blanks from the magazine to the first conveyor. As seen in Figures 6A and 6B, the magazine comprises a rear upright 58 which the rearward ends of the blanks engage and a forward upright 59 which engages and guides the forward ends of the blanks. Side guide plates 61 are provided at the sides of the blanks to hold them in proper alignment. The space between the guides 58 and 59 is preferably slightly shorter than the length of the blanks so that the blanks will be supported in a tilted position with their forward ends down, as seen in Figure 6B. A stop 62 on the guide 59 may engage the rearward ends of the blanks to hold them elevated, as shown.

Normally the forward ends of the blank are held up out of engagement with the belt 54 and are periodically lowered when a blank is to be fed. For this purpose, arms 63 extend at opposite sides of the belt 54 and underlie the forward ends of the blanks. The arms are raised and lowered by cams 64 carried by the shaft 55 which is driven through a large sprocket 66 thereon from a smaller sprocket 67 on the shaft 46. The cams 64 engage followers 65 on the arms 63 and allow the arms to drop once during each revolution of the shaft 55 so that the lowermost blank in the magazine will engage the belt 54 and will be advanced thereby.

As shown in Figure 6B, the belts 48 which underlie the blanks may cooperate with similar belts 66' which overlie and register with the belts 48 and which press the blanks against the belts 48 so that they will be positively fed into the conveyor 38. The belts 66' may be trained over pulleys 67' and 68 which are similar to the pulleys 47 and 49 and if desired the pulleys 47 and 67' can be drivably connected through sprockets, or the like, to turn together.

The first conveyor, as best seen in Figures 6, 6A and 6B, comprises angular side plates 69 formed with upstanding flanges between which the blanks are guided and having an open central portion through which feeding projections 71 on the conveyor 38 may extend. Each feeding projection will engage the rearward end of a blank as it is fed onto the side plates 69 by the belts 48 and 66 and will advance the blank lengthwise thereof.

During movement of the blanks along the first conveyor the sides thereof are folded inward along the fold lines 15. For this purpose the sides are first prefolded or broken and are then folded over flat against the side panel 11 as shown in Figure 2.

Figure 6C:
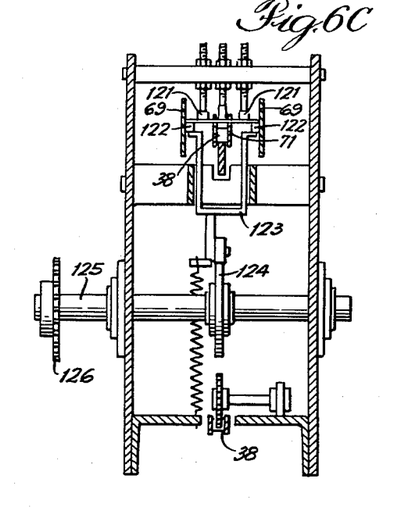
Figure 6C is a section of the prebending means on the line C—C of Figure 6.

For prefolding the blanks, blocks 121, as shown in Figures 6 and 6C are supported closely above the blanks and have their outer edges meeting at an obtuse angle to lie closely adjacent to the fold lines 15 of a blank. Similar blocks or strips 122 are supported for vertical movement below the blanks and have their inner edges meeting at an obtuse angle to lie closely adjacent to the fold lines 15. The blocks or strips 122 are supported by a yoke 123 which is slidably mounted in the machine frame and which is raised by a cam 124 mounted on a shaft 125 which is driven through a sprocket 126 by the continuously running chain 98.

The parts are so timed that a blank will be stopped in registration with the blocks 121 and 122. At this time the cam 124 will raise the yoke 123 and blocks 122 to fold the edge portions of the blank upward about the fold lines 15. This prefolds or breaks the blank so that it will fold easily in the next operation.

Final folding is effected by stationary plows or guides 72 adjacent to the first conveyor. These guides may be constructed in a conventional manner to pick up the side edge portions only of the blank and to fold them over upon the body of the blank, as shown in Figure 2. The folded edge portions are pressed down by stationary rollers 73 to form a hard crease about the fold lines 15 so that the edge portions of the blank will remain folded over although overlying guide projections may be provided if desired above the conveyor support plates 69 to retain the edges in folded condition.

Figure 6D:
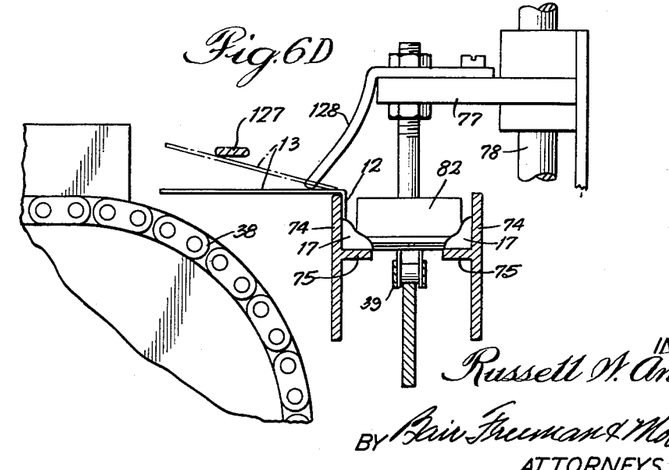
Figure 6D is a partial section of the top prebending means on the line D—D of Figure 6.
Figure 7:
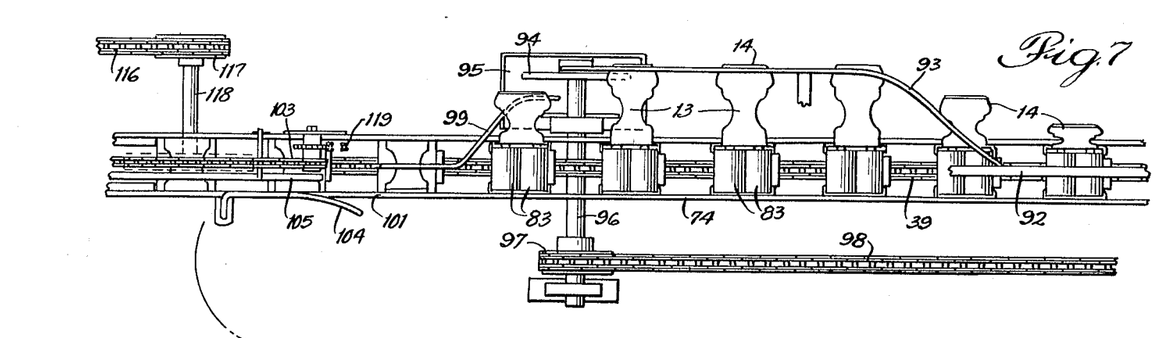
Figure 7 is a top plan view of the second conveyor and the pressing belts with the article feeding means being omitted for clarity.
Figure 9:
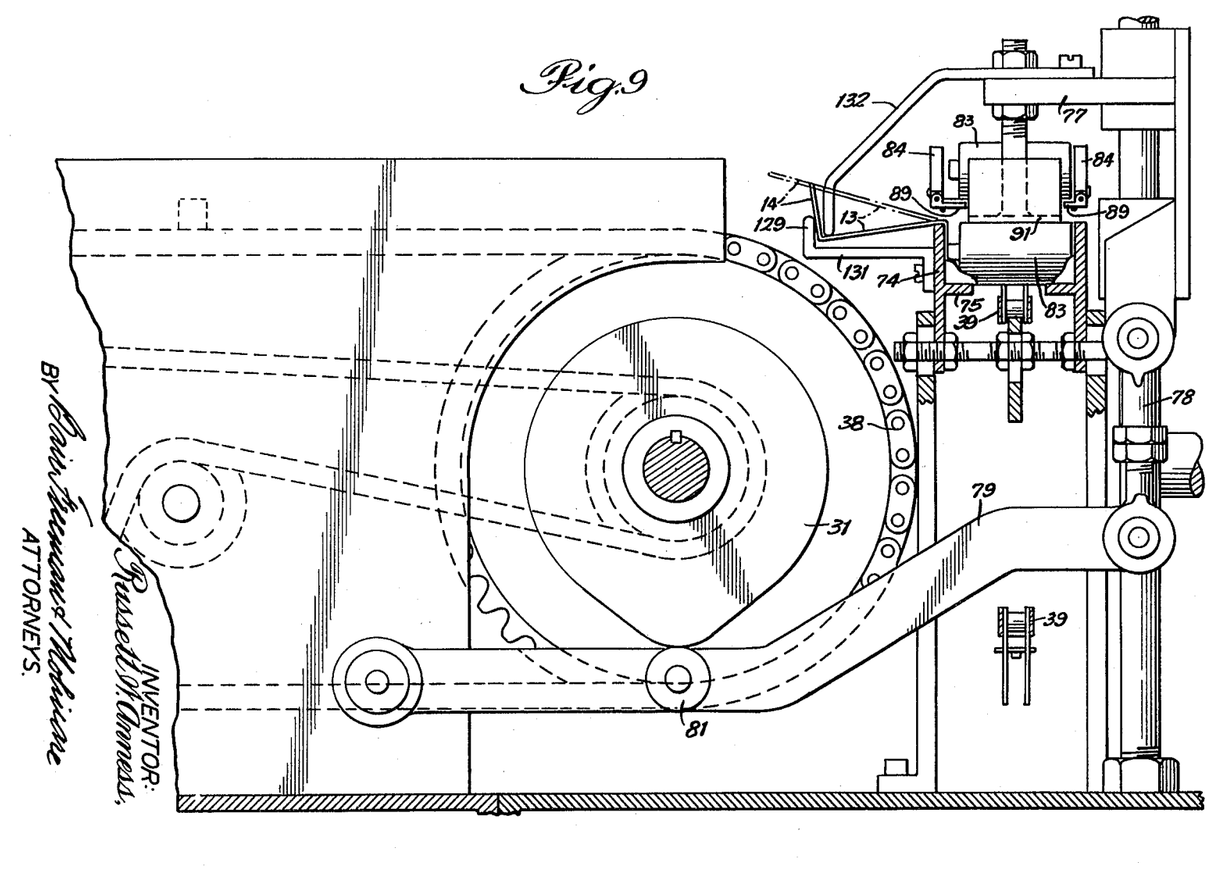
Figure 9 is a partial section on the line 9—9 of Figure 6 showing the drive for the feeding means.

The first conveyors delivers the blanks to the second conveyor which, as seen in Figures 6 and 7, comprises a chain similar to the conveyor chain 39 having projections thereon to engage and move the blanks. The second conveyor, as shown in Figure 6, extends over the sprocket 54 and lies at right angles to the first conveyor 53. The articles transported by the second conveyor are confined in a channel section guide 74 which, as best seen in Figure 9, may comprise side plates whose height is approximately equal to the width of the end walls of the carton with spaced underlying flanges 75 on which the blanks and articles are supported. The blanks are fed in from the first conveyor at substantially the level of the tops of the walls 74 against a stop plate 76 at the side of the conveyor which limits movement of the blanks to a position in which the side wall portion 11 lies between the sides 74 of the second conveyor support. With the blanks in this position, the side wall portion 11 is depressed to move the blanks downward into the conveyor guide 74 substantially as shown in Figure 6D. During this operation, the end wall portions 10 and 12 are bent upwardly relative to the side wall 11 and the saddles and webs are bent outwardly to the position shown in Figure 3.

For this purpose, the mechanism shown in Figures 6D and 9 is employed which comprises a head or carriage 77 mounted for vertical movement and supported by vertically sliding rods 78 which are connected at their lower ends to the free end of a lever 79 extending horizontally beneath the conveyor. The lever 79 carries a cam follower or roller 81 intermediate its ends which engages the cam 31 to be moved down periodically thereby. When the lever is moved down, it will move the head 77 downward and the head 77 carries a presser plate 82 (Figure 6D) overlying the side wall portion 11 of a blank when the blank is in the position it occupies upon being fed over the second conveyor. As the presser plate 82 moves downward, it will engage the side wall portion 11 of the blank and press it down into a position between the guide plates 74 with its lower surface resting against the flanges 75 so that the driving lugs on the conveyor chain 39 will engage the blank and advance it along the second conveyor. As the side wall portion 11 is folded down, the end wall portions 10 and 12 will be bent upward at right angles to the side wall 11 and the saddles and webs 17 and 18 will bend outward to the position shown in Figure 3.

During the pressing down operation the blank is prefolded or broken about the fold line between panels 12 and 13, to facilitate subsequent folding operations. For this purpose a fixed bar 127 is provided extending over the panel 13 of the blank to hold it in a position extending outward from the adjacent guide plate 74, as shown in dotted lines in Figure 6D. The head 77 carries an arm 128 which engages the panel 13 of the blank as the head moves down to bend it sharply about the edge of the guide plate 74 as shown in full lines in Figure 6D.

In the next movement of the conveyors the partially folded blank is moved to a filling station where it is filled and the fold line between panel 13 and end panel 14 is prefolded or broken. For this purpose, as seen in Figure 9, the end panel 14 is supported on the flange 129 of a bracket 131 secured to the guide plate 74. The head 77 carries an arm 132 which will engage the blank near the flange 129 and fold it between panels 13 and 14 as shown in full lines in Figure 9.

Figure 10:
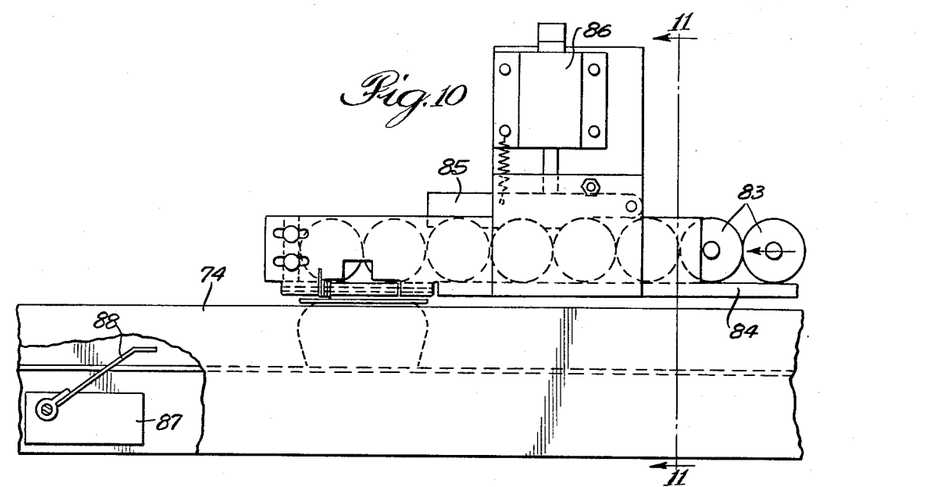
Figure 10 is a partial side elevation showing the article retaining and feeding means.
Figure 11:
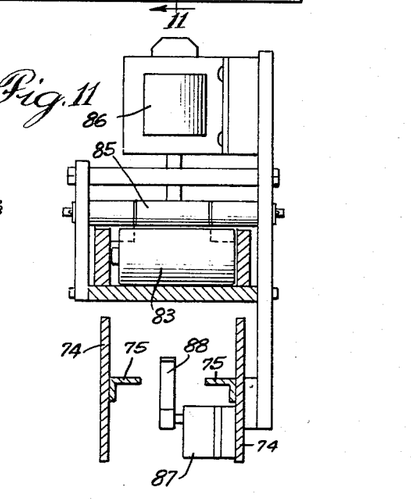
Figure 11 is a section on the line 11—11 of Figure 10.

Articles to be packaged are supplied to the filling station as best seen in Figure 10. As shown in this figure, a series of articles, such as cylindrical flashlight batteries 83, are fed along a supply trough or chute 84 in side-by-side relationship with their lengths transverse to the second conveyor. The articles will roll down the trough or chute 84 by gravity and will be caught at a position just ahead of the feeding position by a holding lever 85 formed with a projection at one end to engage the foremost of the row of articles and hold them against further movement. The lever 85 is adapted to be elevated to release the articles by a solenoid 86 which is controlled by a switch 87. The switch 87 is operated by an arm 88 projecting up between the flanges 75, as shown in Figure 11, to be engaged by the carton blanks as they travel along the second conveyor from left to right, as seen in Figure 10. When a carton blank strikes the arm 88 it will close the switch and energize the solenoid 86 which will elevate the lever 85 to release the articles held on the chute 84. The articles will thereupon roll forward until two articles, as shown in Figure 10, are in a loading position downstream of the second conveyor from the presser plate 82. At the loading position, as shown in Figure 9, the articles are supported by spring fingers 89 pivoted on the sides of the trough or chute 84 and underlying the articles.

To load the articles into the partially formed blank a presser foot 91 is provided connected to the head 77 to be moved downward thereby at the same time the plate 82 is moved downward. As the presser foot moves downward, it will engage the upper surfaces of two articles in the feeding position and will press them past the spring fingers 89 into the partially folded carton which then lies immediately beneath the feeding station. It will be understood that after the carton approaching the feeding station passes and releases the finger 88, it will rise to allow the switch 87 to open so that the solenoid 86 will be de-energized and the arm 85 will drop down to engage the next articles in the series on the feed chute to hold them against advancing to the feeding position.

After the articles are loaded, the partially completed cartons with the articles therein will be intermittently advanced by the second conveyor. Preferably, the articles are engaged by a hold-down bar 92, as shown in Figure 6, which extends above the second conveyor at a height to engage the tops of the articles and hold the articles and partially folded cartons properly in position between the side guide rails 74 and the second conveyor. As the partially completed cartons advance, the side wall 13 and end wall portion 14 are engaged by a guide rail 93 and folded outward to a substantially horizontal position. The guide rail 93 holds the side wall 13 and end wall portion 14 extended until the partially completed cartons have passed a gluing wheel 94 which dips into a glue pot 95 and will wipe over the under or outsurface of the end wall portion 14 adjacent to the end thereof. The glue wheel 94 is carried by a shaft 96 which is driven through a sprocket 97 by a sprocket chain 98 trained over the sprocket 36 on the shaft 25. In this way, the glue wheel is continuously driven and will provide an adequate glue seam on the end portion of each carton as it passes the wheel.

After the carton passes the glue wheel the side portion 13 and end wall portion 14 are folded upward and inwardly over the articles 83 by a fixed guide rod 99, as shown in Figure 7. The guide rod 99 will engage the undersurface of the side wall portion 13 and will fold it upward over the articles 83 and then downward to cover the articles.

Figure 8:
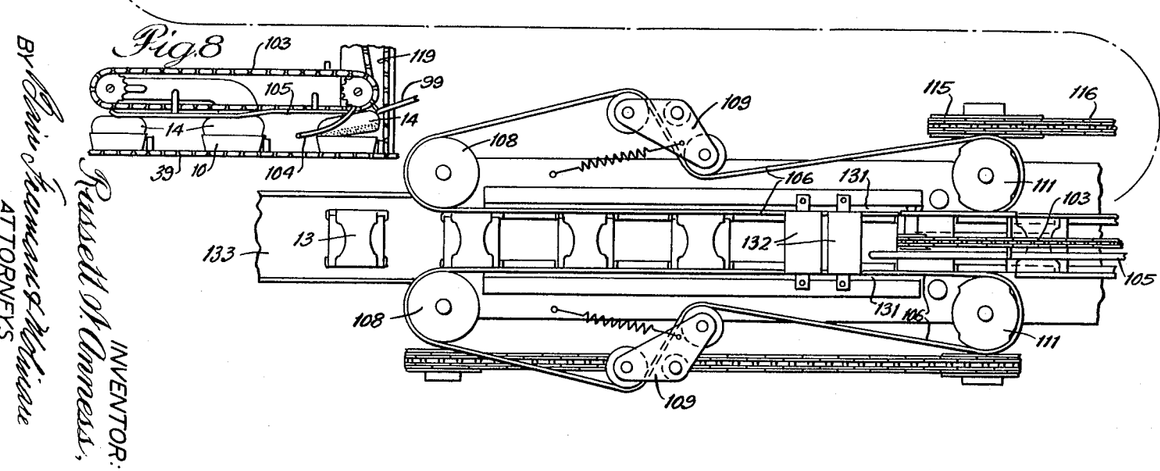
Figure 8 is a partial side elevation of the second conveyor.
Figure 12:
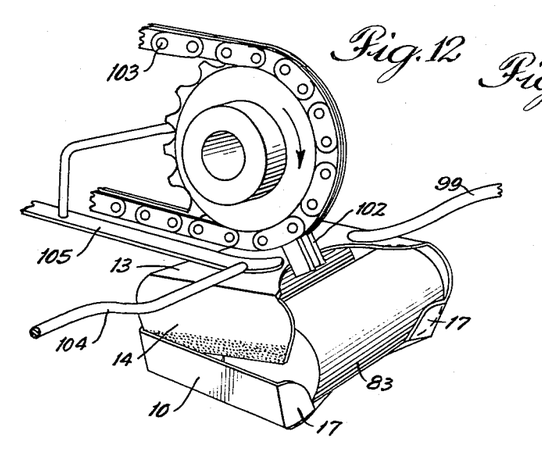
Figure 12 is a partial perspective view of the tucking means.

In the carton, as shown, the end wall portion 14 is tucked in between the end wall portion 10 and the ends of the articles with the glue applied to the outer surface of the end wall portion 14 facing the inner surface of the end wall portion 10 to define a glued seam therebetween. To accomplish this, the side rail 74 of the second conveyor is cut away, as indicated at 101 in Figure 7, to allow the end wall portion 10 of the carton to spring out slightly to the position shown in Figure 12. The end wall portion 13 of the carton is engaged by a lug 102 on a conveyor chain 103 which travels above the second conveyor at this point so that the end wall portion 13 of the carton will be tipped or cocked, as shown in Figure 12. A stationary guide rod 104 lying beside the second conveyor will engage the approaching corner of the end wall portion 14 and will fold it inward against adjacent ends of the articles 83. At the same time, a guide rod or strip 105 above the partially completed articles will engage the upper surface of the side wall portion 113 and press it downward toward and into engagement with the articles. With the cooperation of the lugs 102 on the conveyor, the guide rod 104 and the guide plate 105, the end wall portion 14 is tucked in between the end wall portion 10 and the ends of the articles effectively and rapidly. After the initial tucking, the side wall portion 13 is pressed down tightly against the articles by the guide plate 105, as best seen in Figure 8, so that the carton is ready for final pressing to complete the glue joint.

In order to press the overlapping ends of the carton firmly together to complete the glue joint therebetween, a pair of horizontally spaced vertical belts 106 are provided adjacent to the discharge end of the second conveyor. The belts 106, as best seen in Figure 7, are trained over circular pulleys or drums 108 at their discharge ends and through belt tightener units 109 over eccentric pulleys 111 at their entrance ends. The pulleys 111 are carried by vertical shafts 112 having bevel pinions at their lower ends meshing with bevel pinions on a cross shaft 113. The cross shaft 113 may carry an idler sprocket 114 over which the conveyor 39 is trained and is driven through a sprocket 115 by means of a sprocket chain 116. The sprocket chain 116 is driven by a sprocket 117 carried by a shaft 118. The shaft 118 is driven by a sprocket chain, not shown, but which may be an extension of the driving chain 119 for the conveyor 113 shown in Figure 8 and which is in turn driven from the shaft 96.

As best seen in Figure 7, the pulleys or drums 111 are of generally oblong shape formed of four arcuate segments of different radii joined together so that twice during each revolution of the drums or pulleys 111 the belts will be moved apart to receive a folded and filled carton blank and twice during each revolution the belts will be moved together to grip the blank. The conveyors 39 and 103 will move the filled and folded blanks to a position between the drums 111 in timed relation with rotation of the drums so that when a filled and folded carton is between the entrance ends of the belts the belts will be moved together to grip the carton and advance it. Beyond their entrance ends, the belts are supported by side guide plates 131 which will hold the belts tightly against the ends of the carton to press the overlapping ends of the carton together to complete the glue joint. Preferably pressure rollers 132 overlie the space between the belts to press the side wall portion 113 tightly against the articles 83 and to insure that the end wall portion 14 is pressed fully down into full overlapping relationship with the end wall portion 10. By the time the cartons are discharged from between the belts 106 the glue joint is set and the cartons are completed, ready for further packing and shipment.

As shown in Figure 7, the completed cartons may be received on a chute or conveyor 133 and carried to any desired location for further handling.

While one embodiment of the invention has been shown and described herein, it will be understood that it is illustrative only and not to be taken as a definition of the scope of the invention, reference being had for this purpose to the appended claims.

What is claimed is:

1. Carton forming and loading apparatus for forming and loading from precut and scored blanks open ended cartons of the type having end and side walls and folded flaps and saddles joining the side and end walls to hold articles in the carton, said apparatus comprising first conveyor means to convey flat blanks in a predetermined path, means adjacent to the path to infold flap and saddle portions from the sides of the blank over upon the blank, means to depress a side wall portion of the blank thereby to fold adjacent end wall portions upward at substantially right angles thereto and to outfold the joining saddle portions, means above the conveyor means to deposit a plurality of articles on said side wall portion between the outfolded saddle portions, means adjacent to the conveyor means to fold the other side wall portion of the blank over the articles and to bring the ends of the blank into overlapping relation, and means to secure the overlapping end portions of the blank together.

2. Carton forming and loading apparatus for forming and loading from precut and scored blanks open ended cartons of the type having end and side walls and folded flaps and saddles joining the side and end walls to hold articles in the carton, said apparatus comprising first conveyor means to convey flat blanks in a predetermined path, means adjacent to the path to infold flap and saddle portions from the sides of the blank over upon the blank, means to depress a side wall portion of the blank thereby to fold adjacent end wall portions upward at substantially right angles thereto and to outfold the joining saddle portions, means above the conveyor means to deposit a plurality of articles on said side wall portion between the outfolded saddle portions, means to glue one end of the blank as it is moved by the conveyor means, means adjacent to the conveyor means to fold the other side wall over the articles and to bring the glued end into overlapping relation with the other end of the blank, and means to press the overlapping ends together to form a glued joint therebetween.

3. Carton forming and loading apparatus for forming and loading from precut and scored blanks open ended cartons of the type having end and side walls and folded flaps and saddles joining the side and end walls to hold articles in the carton, said apparatus comprising first conveyor means to convey flat blanks in a predetermined path, means adjacent to the path to infold flap and saddle portions from the sides of the blank over upon the blank, means to depress a side wall portion of the blank thereby to fold adjacent end wall portions upward at substantially right angles thereto and to outfold the joining saddle portions, means above the conveyor means to deposit a plurality of articles on said side wall portion between the outfolded saddle portions, one end wall of the carton being formed by two overlapping end portions foldably connected to the ends of the side walls respectively and lying at the ends of the blank, means to glue one of the end portions as the blank is moved by the conveyor means, means adjacent to the conveyor means to fold the other side wall over the articles and to fold said end portions into overlapping relationship, and means to press the overlapping end portions together to form a glued joint therebetween.

4. The apparatus of claim 3 including means to cock said other side wall as it is folded over the articles and to tuck the end portion connected to said other side wall between the other end portion and the articles.

5. Carton forming and loading apparatus for forming and loading from precut and scored blanks open ended cartons of the type having foldably connected end and side walls, infolded flaps at the edges of one side wall, saddles at the edges of the end walls, and webs joining the adjacent flaps and saddles respectively and in which the joined webs and saddles are defined by straight score lines crossing the fold lines between the end walls and said one side wall, said apparatus comprising a first conveyor to convey flat blanks in a straight path, folding devices adjacent to said path to infold upon the blanks the flaps, saddles and webs about said straight score lines, a second conveyor to receive the partially folded blanks from the first conveyor and to convey the blanks in a straight path at a right angle to the first named path, means above the second conveyor to depress a side wall portion of the blank thereby to fold adjacent end portions upward at substantially right angles thereto and to outfold the joining saddle and web portions, feeding means above the second conveyor to feed a plurality of articles onto said side wall portion between the end portions and the outfolded saddles, folding devices adjacent to the second conveyor to fold the other side portion of the blank over the articles and to bring the ends of the blank into overlapping relationship, and means to secure the overlapping ends of the blank together.

6. The apparatus of claim 5 in which the means to secure the overlapping ends of the carton together comprises a gluing device adjacent to the second conveyor to glue one end of the blank, and means at the discharge end of the second conveyor to press the overlapped ends of the blank together to form a glued joint therebetween.

7. The apparatus of claim 5 in which the overlapped ends of the blank lie at one end wall and the means to secure the ends of the blank together comprises a gluing device adjacent to the second conveyor to glue the end of the blank and means to press the overlapped end of the blank together to complete a glue joint therebetween.

8. The apparatus of claim 5 in which the overlapped ends of the blank lie at one end wall and the means to secure the ends of the blank together comprises a gluing device adjacent to the second conveyor to glue one end of the blank, a pair of horizontally spaced vertical belts between which the filled and folded blanks pass from the second conveyor and which press the overlapped glued ends together, and means to move the entrance ends of the belts apart to receive a filled and folded blank and together to grip the blank.

9. The apparatus of claim 5 in which the overlapped ends of the blank lie at one end wall and the means to secure the ends of the blank together comprises a gluing device adjacent to the second conveyor to glue one end of the blank, a pair of horizontally spaced vertical belts adjacent to the discharge end of the second conveyor to receive folded and filled blanks therefrom, and eccentric drums over which the entrance ends of the belts pass to move the belts apart to receive a folded and filled blank and to move the belts together to grip the blank and press the overlapped ends together.

10. Carton forming and loading apparatus for forming and loading from precut and scored blanks open ended cartons of the type having foldably connected end and side walls, infolded flaps at the edges of one side wall, saddles at the edges of the end walls, and webs joining the adjacent flaps and saddles respectively and in which the joined webs and saddles are defined by straight score lines crossing the fold lines between the end walls and said one side wall, said apparatus comprising a first conveyor to convey flat blanks in a straight path, folding devices adjacent to said path to infold upon the blanks the flaps, saddles and webs about said straight score lines, a second conveyor to receive the partially folded blanks from the first conveyor and to convey the blanks in a straight path at a right angle to the first named path, channel section guide means adjacent to the second conveyor to receive and guide the blanks, means above the guide means to force said one side wall into the guide means thereby to fold the adjacent end wall portions of the blank upward and to outfold the joining saddle and web portions, feeding means above the second conveyor to feed a plurality of articles onto said one side wall between the end portions and the outfolded saddles, folding devices adjacent to the second conveyor to fold the other side portion of the blank over the articles and to bring the ends of the blank into overlapping relationship, and means to secure the overlapping ends of the blank together.

11. The apparatus of claim 10 in which the overlapping ends of the blank lie at one end wall and the means to secure the overlapping ends together comprises means to glue the outer surface of the end of the blanks which is connected to the other side wall, a third conveyor above the second conveyor to engage and cock the other side wall, means to tuck the glued end between the end connected to said one of the side walls and the articles and to press the other side wall against the articles, and means to press the overlapped glued ends of the blank together to complete a glued joint therebetween.

12. The apparatus of claim 11 in which the last named means comprises a pair of horizontally spaced vertical belts between which the folded and filled blanks are fed by the third conveyor, and means to move the entrance ends of the belts apart to receive folded and filled blanks and together to grip the blanks.

13. The apparatus of claim 10 in which the feeding means feeds a pair of cylindrical articles in side-by-side relationship onto said one side wall of each blank with the ends of the articles against the end wall portions.

14. The apparatus of claim 10 in which the feeding means comprises a support to hold a plurality of cylindrical articles above the second conveyor in side-by-side relationship transverse to the second conveyor, means adjacent to the support to release the articles in pairs to a feeding station above the second conveyor, means at the feeding station to support the articles releasably above the second conveyor, and a vertically reciprocable plunger to engage a pair of articles at the feeding station and press them downward onto a blank beneath the feeding station.

15. In carton forming and filling apparatus for forming and loading from precut and scored blanks cartons of the type having foldably connected end and side walls, infolded flaps at the edges of one side wall, saddles at the edges of the end walls, and webs joining the adjacent flaps and saddles and in which the joined flaps, webs and saddles are defined by straight score lines crossing the fold lines between the end walls and said one side wall, means to fold the flaps, webs and saddles over against said one side wall, a support having vertical sides spaced the length of said one side wall to receive the blank, a vertically movable presser to press said one side wall down between the sides of the support thereby to fold adjacent end wall portions upward against the sides of the support, and an arm movable with the presser to engage the other side wall portion and fold it downward over the top of the adjacent side of the support.

16. In carton forming and filling apparatus for forming and loading from precut and scored blanks cartons of the type having foldably connected end and side walls, infolded flaps at the edges of one side wall, saddles at the edges of the end walls, and webs joining the adjacent flaps and saddles and in which the joined flaps, webs and saddles are defined by straight score lines crossing the fold lines between the end walls and said one side wall, means to fold the flaps, webs and saddles over against said one side wall, a support having vertical sides spaced the length of said one side wall to receive the blank, a vertically movable presser to press said one side wall down between the sides of the support thereby to fold adjacent end wall portions upward against the sides of the support, an arm movable with the presser to engage the other side wall portion and fold it downward over the top of the adjacent side of the support, a bracket to engage the lower side of and to support an end wall portion foldably connected to said other side wall portion, and a second arm movable with the presser to engage said other side wall portion adjacent to its foldable connection to said end wall portion and to fold it down relative to said end wall portion.

References Cited in the file of this patent

UNITED STATES PATENTS

| | | |
|---|---|---|
| 2,068,163 | Bowersock et al. | Jan. 19, 1937 |
| 2,109,359 | Seifert | Feb. 22, 1938 |
| 2,677,221 | Currie et al. | May 4, 1954 |